(12) United States Patent
Karapetyan

(10) Patent No.: US 11,743,329 B1
(45) Date of Patent: *Aug. 29, 2023

(54) AUTOMATICALLY SYNCHRONIZING DATA ACROSS APPLICATIONS INSTALLED ON MULTIPLE DEVICES VIA MAIL SERVER

(71) Applicant: Zero Cognitive Systems, Inc., Campbell, CA (US)

(72) Inventor: Gevorg Karapetyan, Sunnyvale, CA (US)

(73) Assignee: Zero Cognitive Systems, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,819

(22) Filed: Apr. 19, 2022

Related U.S. Application Data

(63) Continuation of application No. 16/049,763, filed on Jul. 30, 2018, now Pat. No. 11,310,314.

(60) Provisional application No. 62/538,067, filed on Jul. 28, 2017.

(51) Int. Cl.
*H04L 67/1095* (2022.01)
*H04L 67/00* (2022.01)
*G06F 16/27* (2019.01)
*H04L 9/40* (2022.01)
*G06F 8/65* (2018.01)
*H04L 51/08* (2022.01)

(52) U.S. Cl.
CPC ............ *H04L 67/1095* (2013.01); *G06F 8/65* (2013.01); *G06F 16/27* (2019.01); *H04L 63/02* (2013.01); *H04L 67/34* (2013.01); *H04L 51/08* (2013.01)

(58) Field of Classification Search
None
See application file for complete search history.

(56) References Cited

U.S. PATENT DOCUMENTS

| | | | | |
|---|---|---|---|---|
| 5,647,002 A * | 7/1997 | Brunson | ............ | H04M 3/5307 379/93.24 |
| 5,758,354 A * | 5/1998 | Huang | ................ | G06Q 10/107 |
| 5,948,059 A * | 9/1999 | Woo | ........................ | H04L 51/00 709/206 |
| 6,018,762 A * | 1/2000 | Brunson | ............ | G06Q 10/107 709/248 |
| 6,671,757 B1 * | 12/2003 | Multer | ................ | H04L 67/1095 710/1 |
| 6,721,871 B2 * | 4/2004 | Piispanen | ............ | G06F 16/275 709/219 |
| 6,983,308 B1 * | 1/2006 | Oberhaus | .............. | H04L 51/214 709/248 |
| 7,127,477 B2 * | 10/2006 | Duncombe | ........... | G06F 21/606 707/999.203 |

(Continued)

*Primary Examiner* — Lashonda Jacobs-Burton
(74) *Attorney, Agent, or Firm* — Aka Chan LLP

(57) ABSTRACT

A method and system for synchronization data across applications installed on mobile and desktop devices and remote server uses a mail server. The data to be sent to applications is included in electronic message body or attachment and sent to a predefined email account. The email account is processed via listener applications according to a processing rule such as sender's email address, sender's domain, header information, or metadata. When an email matches the rule, an action is triggered that acquires data from attachment of email or body and updates local storage.

20 Claims, 11 Drawing Sheets

(56) References Cited

U.S. PATENT DOCUMENTS

| | | | |
|---|---|---|---|
| 7,136,897 B1* | 11/2006 | Raghunandan | G06Q 10/00 709/236 |
| 7,191,218 B1* | 3/2007 | Innes | H04M 3/533 709/224 |
| 7,243,163 B1* | 7/2007 | Friend | G06F 15/16 709/248 |
| 7,962,575 B2* | 6/2011 | Glatt | H04L 67/1095 709/248 |
| 8,396,466 B2* | 3/2013 | Sharma | H04W 99/00 455/418 |
| 8,577,995 B2* | 11/2013 | Suryanarayana | H04L 67/02 709/227 |
| 8,812,438 B2* | 8/2014 | Long | G06F 16/273 718/1 |
| 8,880,735 B2* | 11/2014 | Tosey | G06F 16/27 709/248 |
| 9,146,936 B2* | 9/2015 | Roka | G06F 16/178 |
| 9,166,941 B2* | 10/2015 | Glickstein | H04L 67/1095 |
| 9,251,235 B1* | 2/2016 | Hurst | G06F 16/275 |
| 9,552,407 B1* | 1/2017 | Hurst | G06F 16/275 |
| 9,703,801 B2* | 7/2017 | Melahn | G06F 16/178 |
| 9,967,338 B2* | 5/2018 | Ahn | H04L 51/42 |
| 10,129,231 B2* | 11/2018 | Anderson | H04L 63/0876 |
| 10,129,721 B2* | 11/2018 | Lee | H04W 4/60 |
| 2001/0044805 A1* | 11/2001 | Multer | G06F 16/182 |
| 2002/0065892 A1* | 5/2002 | Malik | H04L 51/08 707/999.01 |
| 2002/0065939 A1* | 5/2002 | Liu | G06F 1/1656 709/248 |
| 2003/0097381 A1* | 5/2003 | Detweiler | G06F 16/2308 |
| 2003/0115301 A1* | 6/2003 | Koskimies | H04L 9/40 709/221 |
| 2005/0055386 A1* | 3/2005 | Tosey | G06Q 10/107 |
| 2007/0014314 A1* | 1/2007 | O'Neil | H04L 67/1095 370/503 |
| 2007/0038641 A1* | 2/2007 | Fawcett | G06F 16/957 |
| 2008/0005280 A1* | 1/2008 | Adams | H04L 51/214 709/219 |
| 2008/0126489 A1* | 5/2008 | Potluri | H04L 51/00 709/206 |
| 2009/0037452 A1* | 2/2009 | Baitalmal | G06F 16/27 |
| 2009/0037492 A1* | 2/2009 | Baitalmal | H04L 67/34 |
| 2009/0198772 A1* | 8/2009 | Kim | H04L 67/02 709/203 |
| 2009/0222902 A1* | 9/2009 | Bender | H04L 63/0823 726/10 |
| 2009/0282125 A1* | 11/2009 | Jeide | H04L 67/1095 709/217 |
| 2010/0190474 A1* | 7/2010 | Rajguru | H04W 12/08 707/610 |
| 2010/0198783 A1* | 8/2010 | Wang | G06F 16/275 707/610 |
| 2011/0151837 A1* | 6/2011 | Winbush, III | H04W 8/22 455/414.1 |
| 2012/0079095 A1* | 3/2012 | Evans | G06F 16/27 709/224 |
| 2013/0066832 A1* | 3/2013 | Sheehan | G06Q 10/00 707/634 |
| 2013/0080765 A1* | 3/2013 | Mohanty | H04L 63/126 713/150 |
| 2013/0282564 A1* | 10/2013 | Sibbald | H04L 67/06 709/217 |
| 2015/0082410 A1* | 3/2015 | Fitzgerald | H04L 63/0853 726/9 |
| 2016/0088064 A1* | 3/2016 | Chen | H04L 67/568 709/204 |
| 2016/0132214 A1* | 5/2016 | Koushik | G06F 8/61 715/741 |
| 2017/0063845 A1* | 3/2017 | Sojoodi | H04W 4/023 |
| 2017/0201502 A1* | 7/2017 | Sun | G06F 21/60 |
| 2018/0081962 A1* | 3/2018 | Obitko | G06F 16/214 |
| 2018/0288170 A1* | 10/2018 | Yin | H04L 67/12 |

* cited by examiner

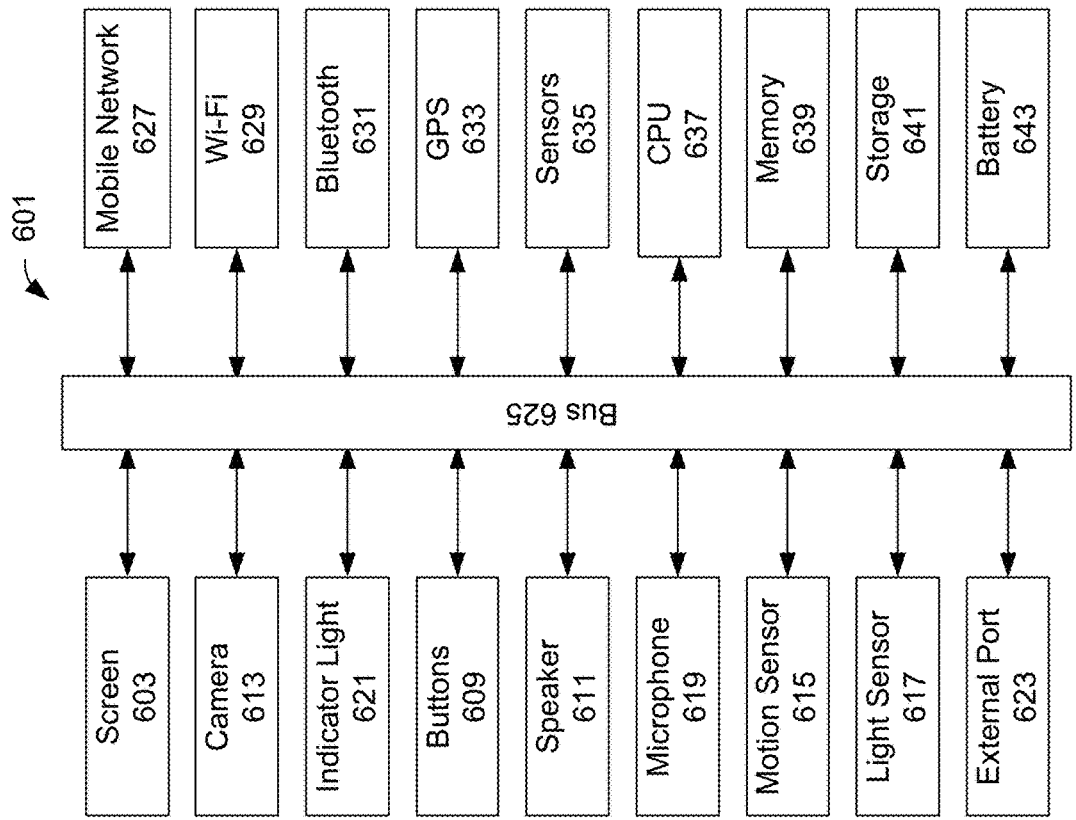
Figure 6
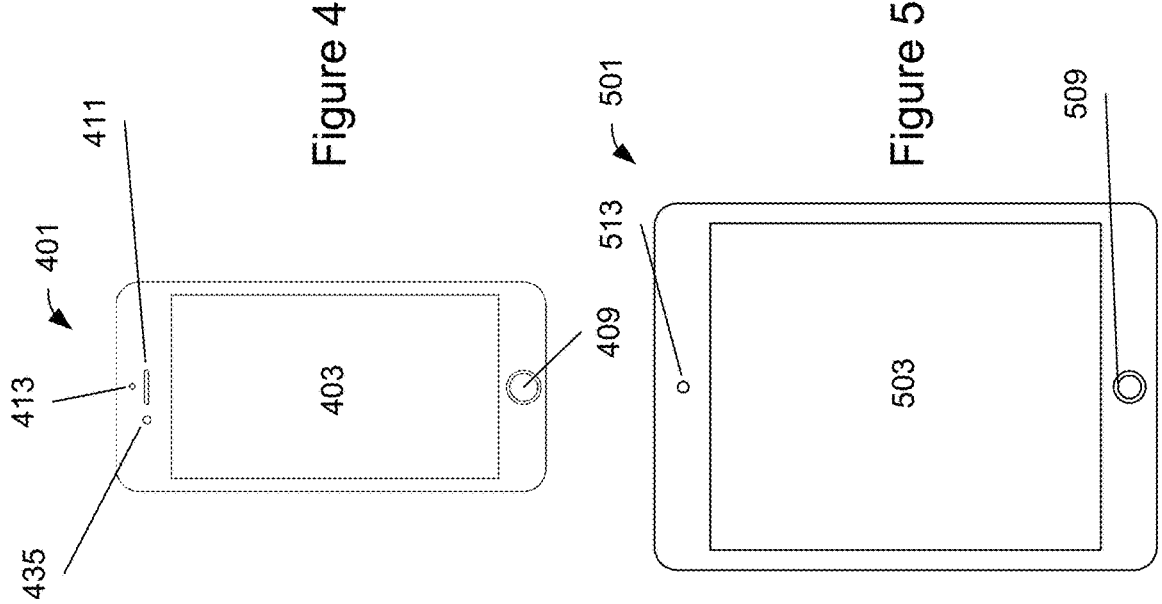
Figure 4
Figure 5

*Current state is generated in predefined time (like once a day).

AUTOMATICALLY SYNCHRONIZING DATA ACROSS APPLICATIONS INSTALLED ON MULTIPLE DEVICES VIA MAIL SERVER

CROSS-REFERENCE TO RELATED APPLICATIONS

This patent application is a continuation of Ser. No. 16/049,763, filed Jul. 30, 2018, issued as U.S. Pat. No. 11,310,314 on Apr. 19, 2022, which claims the benefit of U.S. patent application 62/538,067, filed Jul. 28, 2017. These applications are incorporated by reference along with all other references cited in this application.

BACKGROUND OF THE INVENTION

This invention relates in general to software technology and, more specifically, to methods and systems for automatic data synchronization across applications installed on multiple mobile devices, desktops and remote server via mail server.

Many applications create data for the user on client applications and server, such as result of supervised or unsupervised learning, user preferences, user notes etc. Often a user would like to synchronize that data across multiple devices or remote server, or a combination. If both client devices and server are able to send and receive electronic emails it is desirable to have method and system for synchronization of data across multiple devices or remote server, or a combination, via email protocols, particularly, as examples, IMAP, SMTP, EWS, ACTIVE SYNC, or GMAIL application program interface (API).

Therefore, new and improved methods and systems are needed for synchronization of data across multiple devices or remote server, or any combination of devices and servers, via email protocols.

BRIEF SUMMARY OF THE INVENTION

A method and system for synchronization data across applications installed on mobile and desktop devices and remote server uses a via mail server. The data to be sent to applications is included in electronic message body or attachment and sent to a predefined email account. The email account is processed via listener applications according to a processing rule such as sender's email address, sender's domain, header information, metadata. When electronic email matches the rule an action is triggered that acquires data from attachment of email or body and updates local storage.

The embodiments described in this patent are directed to methods and systems that substantially obviate one or more of the above and other problems associated with conventional technology. In accordance with one aspect of the embodiments described, there is provided a method and system for synchronization data across applications installed on mobile and desktop devices and remote server via mail server. The data to be sent to applications is included in electronic message body or attachment and sent to predefined email account. The email account is being processed via listener applications according to processing rule such as sender's email address, sender's domain, header information, metadata. When electronic email matches the rule an action is triggered that acquires data from attachment of email or body and updates local storage.

A system includes nodes (e.g., mobile apps, tablet apps, desktop and server applications, or scripts). Synchronization of the data across nodes is implemented via mail server. In each node an appropriate application is installed. For each data type the node can be producer, consumer or both producer and consumer of the data.

Once a new device with appropriate software is added to the system and has credentials of the mail server via which the data is being synced, it can easily start consuming and procuring the data.

Data types that are synced across applications installed on devices, desktops and servers can be updatable or replaceable. Updatable is like a record in database (DB) every time new record can be added. When new update comes, it is just added to existing data. Replaceable is like trained machine learning data, that once new data is pushed or received, the old data is replaced with the new data.

For updatable data type, an application generates two types of emails. A first email contains the changes (i.e., DELTA) and the other one all changes merged. All changes merged can be referred to as "current state." This means all changes made by user for a current data type, which we call current state. Applications in their place can have different roles: only data producers, only data consumers, or both.

In an implementation, a method includes synchronizing data across applications installed on mobile and desktop devices and remote server via an mail server where data to be sent to applications is included in an electronic message body or attachment and sent to a predefined email account; the predefined email account is being processed via listener applications according to a processing rule based on sender's email address, sender's domain, header information, metadata; and when electronic email matches the rule an action is triggered that acquires data from an attachment of the email or body of the email and updates a local storage.

In an implementation, a method includes: providing a first device including a first application instance and a first data storage; providing a second device including a second application instance and a second data storage; providing a mail server, connected to the first and second devices via a network (e.g., Internet or Ethernet); making a first data change by a first user at the first device in the first application instance; including information about the first data change to a first email and sending the first email with the first data change addressed to a predefined email address to the mail server; at the second device, receiving the first email for the predefined email address with the first data change; making a determination whether to apply the first data change to the second application instance on the second device; and if the determination is true, altering the second application instance using the first data change.

In various implementations, the method includes if the determination is false, not altering the second application instance using the first data change. The making a determination whether to apply the first data change to the second application instance on the second device can include: determining a data type of the first data change as being updatable or replaceable, where when the data type is updatable, the altering the second application instance using the first data change can include updating the second application instance using the first data change. When the data type is replaceable, the altering the second application instance using the first data change can include replacing data of the second application instance using the first data change.

The method can include after the receiving the first email for the predefined email address with the first data change at the second device, checking if the second data storage is empty, and when empty, storing the first data change in the second data storage. The method can include after the receiving the first email for the predefined email address with the first data change at the second device, checking if the second data storage is empty, and when not empty, determining whether a date of the first data change is newer than a data change already stored in the second data storage. When the first data change is newer, replacing the data change already stored in the second data storage with the first data change. And, when the first data change is not newer, not replacing the data change already stored in the second data storage with the first data change.

The method can include after the receiving the first email for the predefined email address with the first data change at the second device, checking if the second data storage is empty, and when not empty, determining whether a date of the first data change is newer than a data change already stored in the second data storage. When the first data change is newer by a predefined threshold, replacing the data change already stored in the second data storage with the first data change. When the first data change is not newer by the by a predefined threshold, not replacing the data change already stored in the second data storage with the first data change.

The making a determination whether to apply the first data change to the second application instance on the second device can include: determining a data type of the first data change as being updatable or replaceable. When the data type is replaceable, a date of a second data change already stored in the second data storage is compared to a date of the first data change received at the mail server. When the date of the first data change is newer than the second data change already stored in the second data storage, the data change already stored in the second data storage is replaced with the first data change downloaded from the mail server.

When the date of the second data change already stored in the second data storage is newer than the first data change, the second data change is sent (e.g., pushed or email send via IMAP or SMTP) to the mail server via a second email from the second device to the predefined email address.

The first data change can be an attachment to the first email. The first data change can be stored in a body portion of the first email. The first data change can be stored in a subject line portion of the first email.

The method can include: automatically updating the first data storage at the first device with a current state of the first application instance according to a predefined schedule; sending the current state stored in the first data storage by a second email for the predefined email address to the mail server; receiving the second email at the second device with the current state; and altering the second application instance based on the current state received via the second email.

The method can include: determining if a number of emails stored at the mail server for the predefined email address with change information is greater than a predefined maximum number of emails; and if the number of emails exceeds the predefined maximum number of emails, deleting emails with change information stored at the mail server for the predefined email address, where the oldest emails are deleted first.

The first and second application instances can be time-tracking applications. The first device can be a mobile device while the second device is a desktop computer. The first device can use a first operating system and the second device can use a second operating system, different from the first operating system.

A first plugin to the first application instance can handle the including information about the first data change to a first email and sending the first email with the first data change addressed to a predefined email address to the mail server. A second plugin to the second application instance can handle the at the second device, receiving the first email for the predefined email address with the first data change, making a determination whether to apply the first data change to the second application instance on the second device, and if the determination is true, altering the second application instance using the first data change.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-5 show examples of mobile devices, which can be mobile clients.

FIG. 6 shows a system block diagram of mobile device.

DETAILED DESCRIPTION OF THE INVENTION

Figure 1:
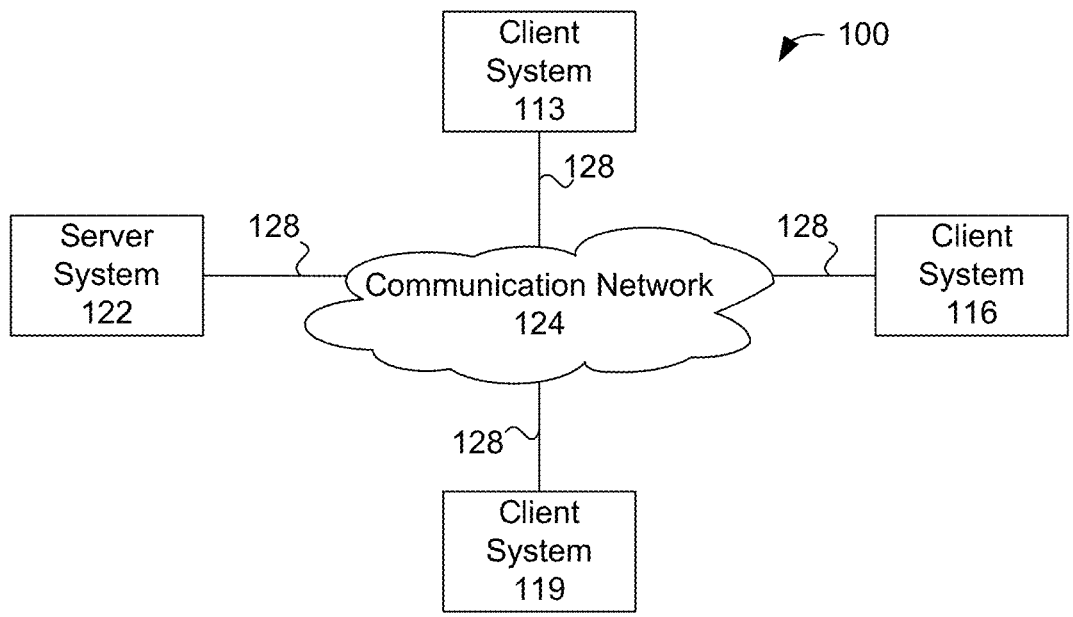
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
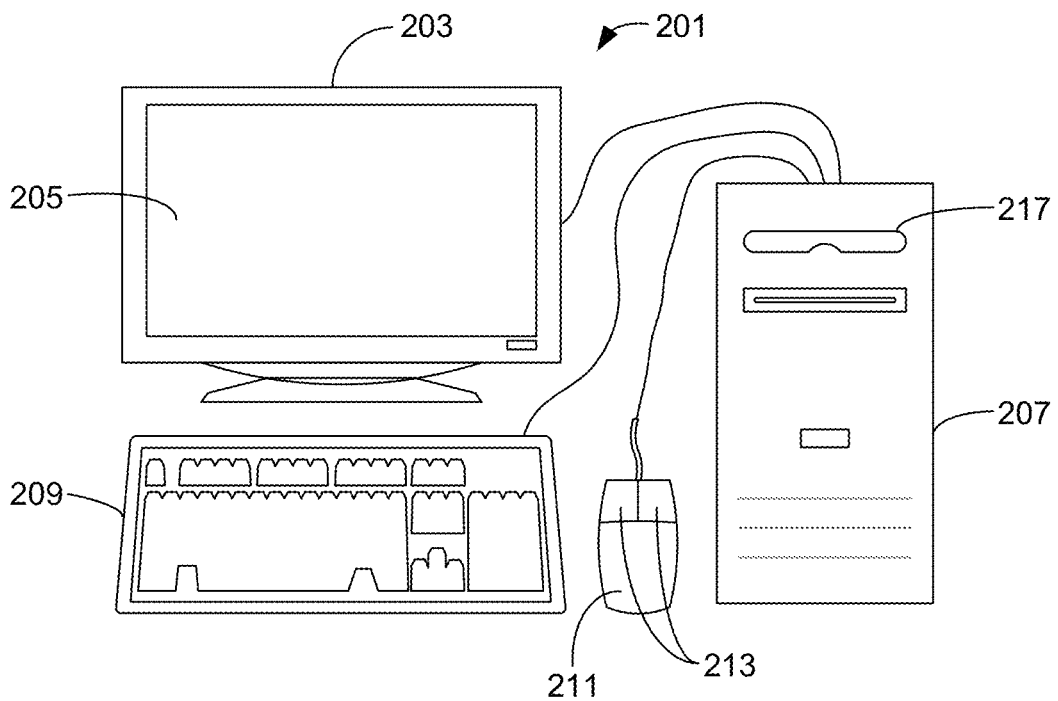
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g., Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
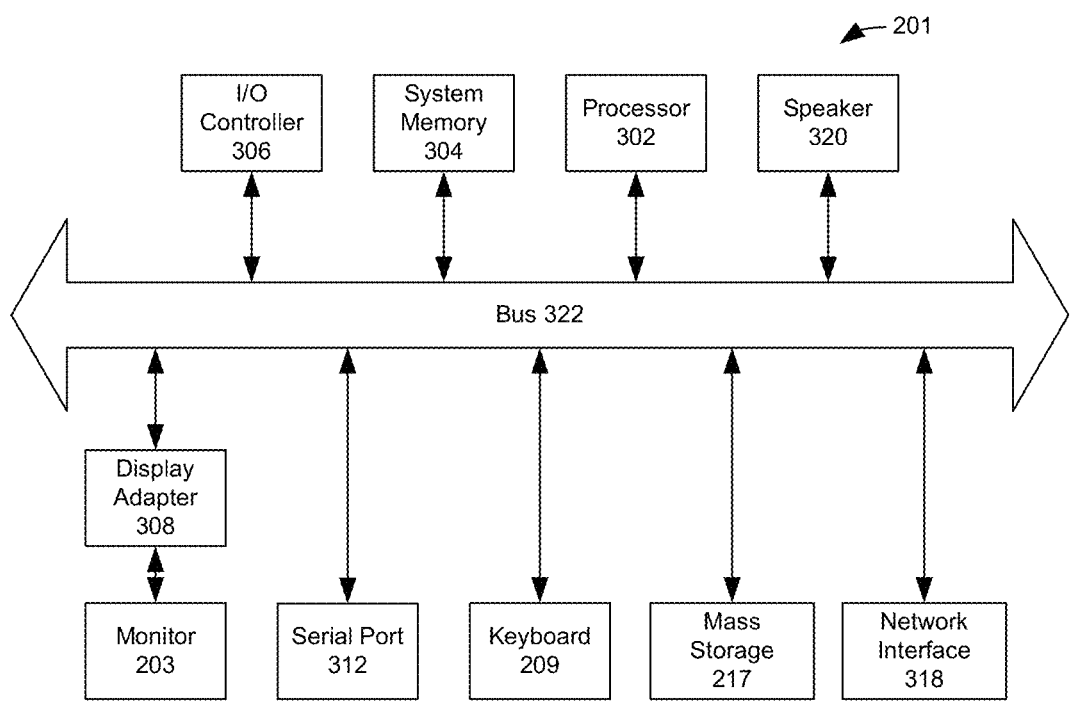
FIG. 3 shows a system block diagram of a client computer system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

FIGS. 4-5 show examples of mobile devices, which can be mobile clients. Mobile devices are specific implementations of a computer, such as described above. FIG. 4 shows a smartphone device 401, and FIG. 5 shows a tablet device 501. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 401 has an enclosure that includes a screen 403, button 409, speaker 411, camera 413, and proximity sensor 435. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 409 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 501 is similar to a smartphone. Tablet 501 has an enclosure that includes a screen 503, button 509, and camera 513. Typically the screen (e.g., touch screen) of a tablet is larger than a smartphone, usually 7, 8, 9, 10, 12, 13, or more inches (measured diagonally).

FIG. 6 shows a system block diagram of mobile device 601 used to execute the software of the present invention. This block diagram is representative of the components of smartphone or tablet device. The mobile device system includes a screen 603 (e.g., touch screen), buttons 609, speaker 611, camera 613, motion sensor 615, light sensor 617, microphone 619, indicator light 621, and external port 623 (e.g., USB port or Apple Lightning port). These components can communicate with each other via a bus 625.

The system includes wireless components such as a mobile network connection 627 (e.g., mobile telephone or mobile data), Wi-Fi 629, Bluetooth 631, GPS 633 (e.g., detect GPS positioning), other sensors 635 such as a proximity sensor, CPU 637, RAM memory 639, storage 641 (e.g., nonvolatile memory), and battery 643 (e.g., lithium ion or lithium polymer cell). The battery supplies power to the electronic components and is rechargeable, which allows the system to be mobile.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Data synchronization between applications, which are installed in different devices typically, is done via third party servers, clouds. The data is uploaded to remote server (cloud) and then downloaded via applications on other devices triggered by pull or push requests. Data synchronization between mobile or desktop application and remote server typically is done via web protocols, usually https. This requires that remote sever should have remote access.

Currently, the synchronization of data across applications installed on mobile devices and desktops requires remote server. The data from applications is uploaded to server and then downloaded to other devices via pull or push requests. This solution has security issue since personal information that should be synchronized is moved via server that can be hacked and sensitive information can be leaked.

The other issue that corporations that have applications (in servers) installed behind their firewalls due to security reasons do not allow remote access to their applications/servers. So if mobile application needs remote access to application which is installed in server of corporation an access should be granted. The application should be whitelisted. This is serious concern and can be threat of attack.

In accordance with one aspect of the embodiments described in this patent, there are provided methods and systems for automatic data synchronization across applications installed on multiple mobile devices, desktops, and remote server via mail server.

Figure 7:
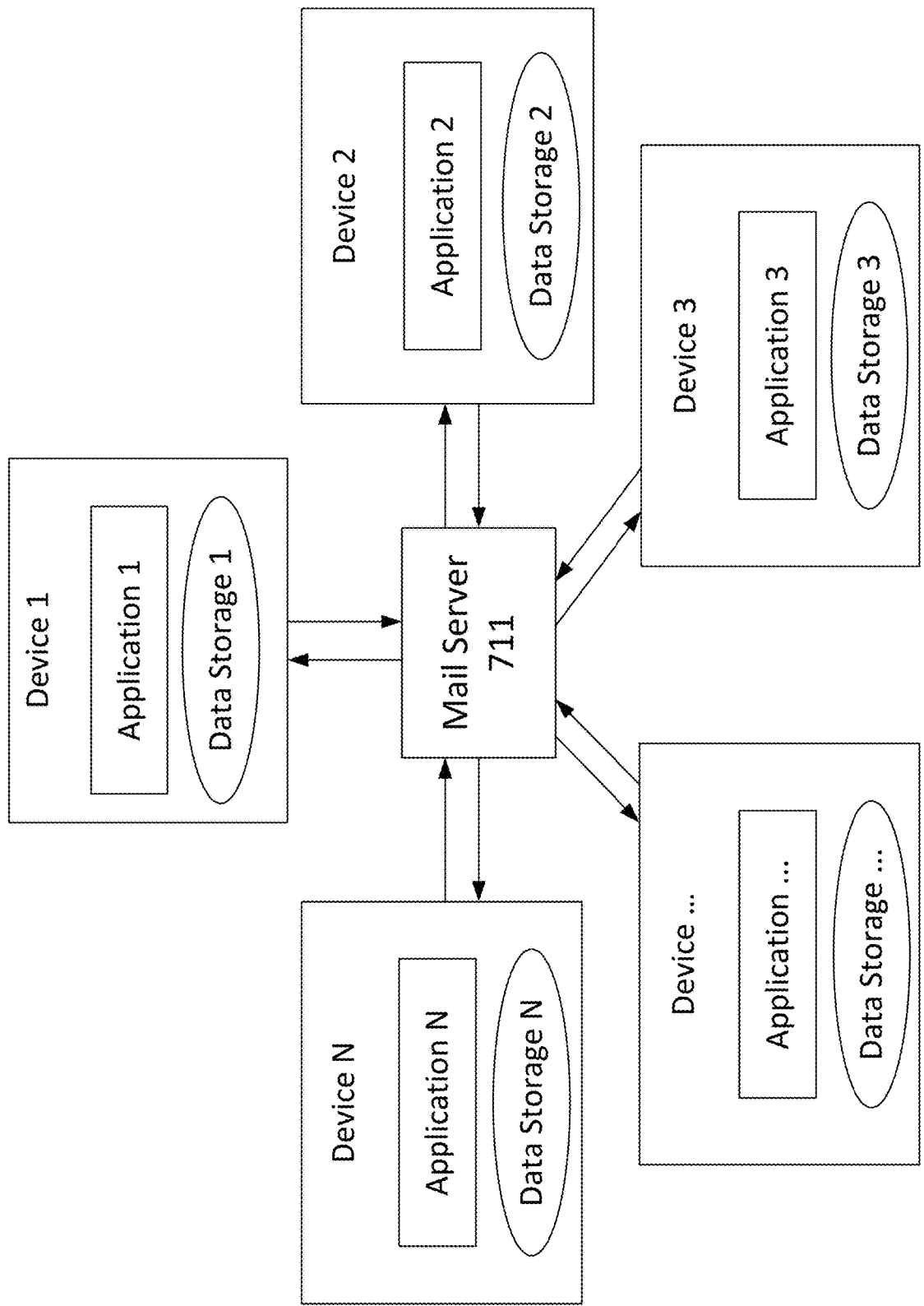
FIG. 7 shows an overview of an email-server-based synchronization system, where N nodes (e.g., applications or apps installed on different devices) synchronize data via a mail server.

FIG. 7 shows an overview of an email-server-based synchronization system, where N nodes (e.g., applications or apps installed on different devices) synchronize data via a mail server 711. This is an embodiment of an email-server-based synchronization. In one or more embodiments, devices 1 . . . N are user's devices where particular applications are installed. Each device has an application 1 . . . N and data storage 1 . . . N. The applications can be installed on, for example, devices including a mobile device, desktop, server, or be a plugin of another system (e.g., plugin of mail application or Web browser). The application includes a module for sending and receiving emails, local storage, other business logic, and a user interface (UI). The mail server can be, for example, Microsoft Exchange, Google Gmail, Microsoft Hotmail, Yahoo, America Online (AOL), or others. The data is sent from application to mail server and then is fetched or pulled from other applications. Both sending and fetching are done via email protocols such as Internet Message Access Protocol (IMAP), Simple Mail Transfer Protocol (SMTP), Exchange Web Services (EWS), Microsoft ActiveSync, Google Gmail application program interface (API), or others.

In one or more embodiments, when user uses the application, data is being generated which can be data of supervised or unsupervised machine learning, application settings data, and so forth. The generated data is being sent to predefined email address as attachment or in body of electronic message. The email includes features that indicates that it contain information to be synchronized.

First Embodiment

In one or more embodiments, the application A can be installed in several mobile devices with one user (U1) account. U1 has two devices, for example, an iPhone and iPad. Application A is a recommendation app that suggests the user to file emails into an appropriate folder in a documents management system. Suggestion is done is work based on machine learning (ML) model which is stored on its local device. The model was trained on remote server on large data set. The dataset is very sensitive so the server on which the training was done, has no remote access to it.

In one or more embodiments, to transfer the trained data to user's device, for making the application work smart, the server sends email to predefined email address and in attachment of the email includes the trained data. The (A) application installed on user's (U1) devices periodically scan the mailbox of User U1 to find email containing data. Once they find the email they store the data in local storage and the recommendation algorithm uses that model for better recommendations.

Second Embodiment

In one or more embodiments, user "U1" on device "D1" uses application "A1" which is installed on other D2 device. Application A1 learns user preferences and behavior and accumulates personalized data, which dramatically improves the user experience of usage application A1. If user U1 uses application A1 on D1 for long time, personalized data is being created and stored on D1's local storage. It is desirable user to synchronize the collected data across his other devices.

In that case the A1 installed on D1 sends email with user data to U1s email account via electronic mail. The A1 installed on D2 fetch the email and update the local storage. In result of this the trained data is being synced and there is no need to synchronize it via remote server.

Computing Platform

Figure 8:
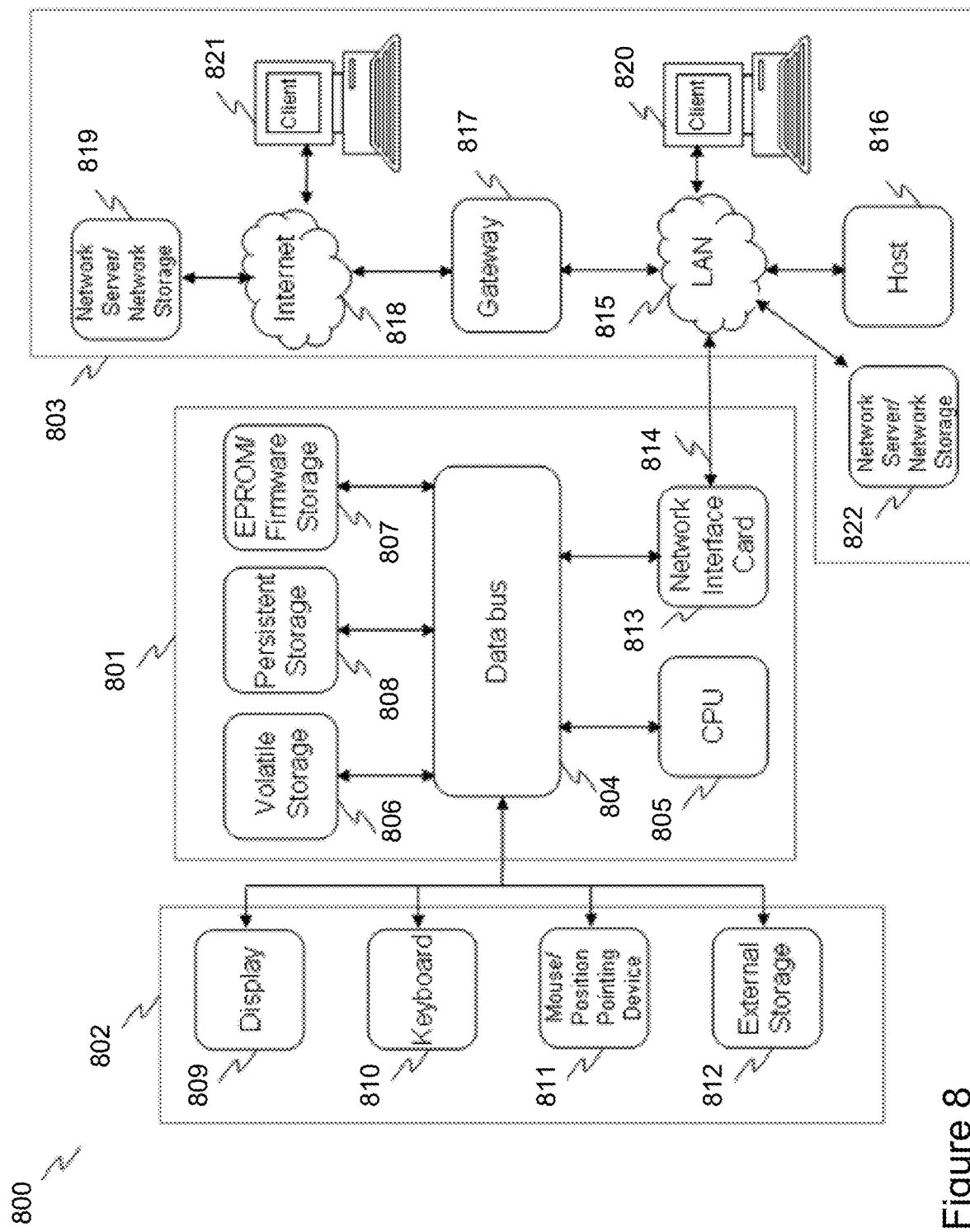
FIG. 8 shows an embodiment of a computer platform whereupon the various embodiments described in this patent may be implemented.

FIG. 8 is a block diagram that illustrates an embodiment of a computer system 800 upon which various embodiments of the inventive concepts described in this patent may be implemented. The system 800 includes a computer platform 801, peripheral devices 802 and network resources 803.

The computer platform 801 may include a data bus 804 or other communication mechanism for communicating information across and among various parts of the computer platform 801, and a processor 805 coupled with bus 804 for processing information and performing other computational and control tasks. Computer platform 801 also includes a volatile storage 806, such as a random access memory (RAM) or other dynamic storage device, coupled to bus 804 for storing various information as well as instructions to be executed by processor 805, including the software application for proxy detection described above. The volatile storage 806 also may be used for storing temporary variables or other intermediate information during execution of instructions by processor 805. Computer platform 801 may further include a read only memory (ROM or EPROM) 807 or other static storage device coupled to bus 804 for storing static information and instructions for processor 805, such as basic input-output system (BIOS), as well as various system configuration parameters. A persistent storage device 808, such as a magnetic disk, optical disk, or solid-state flash memory device is provided and coupled to bus 804 for storing information and instructions.

Computer platform 201 may be coupled via bus 804 to a touch-sensitive display 809, such as a cathode ray tube (CRT), plasma display, or a liquid crystal display (LCD), for displaying information to a system administrator or user of the computer platform 801. An input device 810, including alphanumeric and other keys, is coupled to bus 804 for communicating information and command selections to processor 805. Another type of user input device is cursor control device 811, such as a mouse, a trackball, or cursor direction keys for communicating direction information and command selections to processor 805 and for controlling cursor movement on touch-sensitive display 809. This input device typically has two degrees of freedom in two axes, a first axis (e.g., x) and a second axis (e.g., y), that allows the device to specify positions in a plane. To detect user's gestures, the display 809 may incorporate a touchscreen interface configured to detect user's tactile events and send information on the detected events to the processor 805 via the bus 804.

An external storage device 812 may be coupled to the computer platform 801 via bus 804 to provide an extra or removable storage capacity for the computer platform 801. In an embodiment of the computer system 800, the external removable storage device 812 may be used to facilitate exchange of data with other computer systems.

The invention is related to the use of computer system 800 for implementing the techniques described in this patent. In an embodiment, the inventive system may reside on a machine such as computer platform 801. According to one embodiment of the invention, the techniques described in this patent are performed by computer system 800 in response to processor 805 executing one or more sequences of one or more instructions contained in the volatile memory 806. Such instructions may be read into volatile memory 806 from another computer-readable medium, such as persistent storage device 808. Execution of the sequences of instructions contained in the volatile memory 806 causes processor 805 to perform the process steps described in this patent. In alternative embodiments, hard-wired circuitry may be used in place of or in combination with software instructions to implement the invention. Thus, embodiments of the invention are not limited to any specific combination of hardware circuitry and software.

The term "computer-readable medium" as used in this patent refers to any medium that participates in providing instructions to processor 805 for execution. The computer-readable medium is just one example of a machine-readable medium, which may carry instructions for implementing any of the methods or techniques, or both, described in this patent. Such a medium may take many forms, including but not limited to, nonvolatile media and volatile media. Nonvolatile media includes, for example, optical or magnetic disks, such as the persistent storage device 808. Volatile media includes dynamic memory, such as volatile storage 806.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 805 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infrared detector can receive the data carried in the infra-red signal and appropriate circuitry can place the data on the data bus 804. The bus 804 carries the data to the volatile storage 806, from which processor 805 retrieves and executes the instructions. The instructions received by the volatile memory 806 may optionally be stored on persistent storage device 808 either before or after execution by processor 805. The instructions may also be downloaded into the computer platform 801 via Internet using a variety of network data communication protocols well known in the art.

The computer platform 801 also includes a communication interface, such as network interface card 813 coupled to the data bus 804. Communication interface 813 provides a two-way data communication coupling to a network link 814 that is coupled to a local network 815. For example, communication interface 813 may be an integrated services digital network (ISDN) card or a modem to provide a data communication connection to a corresponding type of telephone line. As another example, communication interface 813 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 813 sends and receives electrical, electromagnetic or optical signals that carry digital data streams representing various types of information.

Network link 814 typically provides data communication through one or more networks to other network resources. For example, network link 814 may provide a connection through local network 815 to a host computer 816, or a network storage or server 822, or both. Additionally or alternatively, the network link 814 may connect through gateway or firewall 817, or both, to the wide-area or global network 818, such as an Internet. Thus, the computer platform 801 can access network resources located anywhere on the Internet 818, such as a remote network storage or server 819, or both. On the other hand, the computer platform 801 may also be accessed by clients located anywhere on the local area network 815 and/or the Internet 818. The network clients 820 and 821 may themselves be implemented based on the computer platform similar to the platform 801.

Local network 815 and the Internet 818 both use electrical, electromagnetic or optical signals that carry digital data streams. The signals through the various networks and the signals on network link 814 and through communication interface 813, which carry the digital data to and from computer platform 801, are some example of forms of carrier waves transporting the information.

Computer platform 801 can send messages and receive data, including program code, through the variety of networks including Internet 818 and LAN 815, network link 815 and communication interface 813. In the Internet example, when the system 801 acts as a network server, it might transmit a requested code or data for an application program running on one or more clients 820 and 821 through the Internet 818, gateway or firewall 817, local area network 815 and communication interface 813. Similarly, it may receive code from other network resources.

The received code may be executed by processor 805 as it is received, and/or stored in persistent or volatile storage devices 808 and 806, respectively, or other nonvolatile storage for later execution.

Finally, it should be understood that processes and techniques described in this patent are not inherently related to any particular apparatus and may be implemented by any suitable combination of components. Further, various types of general purpose devices may be used in accordance with the teachings described in this patent. It may also prove advantageous to construct specialized apparatus to perform the method steps described in this patent. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, Perl, Shell, PHP, Java, as well as any now known or later developed programming or scripting language.

Moreover, other implementations of the invention will be apparent to those skilled in the art from consideration of the specification and practice of the invention disclosed in this patent. Various aspects or components, or combinations, of the described embodiments may be used singly or in any combination in the methods and systems for automatic data synchronization across applications installed on multiple mobile devices, desktops, and remote server via mail server. It is intended that the specification and examples be considered as examples only, with a true scope and spirit of the invention being indicated by the following claims.

In one or more embodiments, applications scan predefined email account in mail server via processing rule such as sender's email address, sender's domain, header information, metadata. Once an email meets a rule's criteria, data from the email's attachment or body is used to update the local storage. In contrast to a server approach where the data before being synchronized is uploaded to remote server and then downloaded via clients, here the data is stored in by a mail server in users' mailboxes and then the email containing synced information will be fetched via other applications. The described embodiment of the invention synchronizes data via an email server, which has proven secure access both from applications installed on servers inside organization and on mobile devices.

Figure 9:
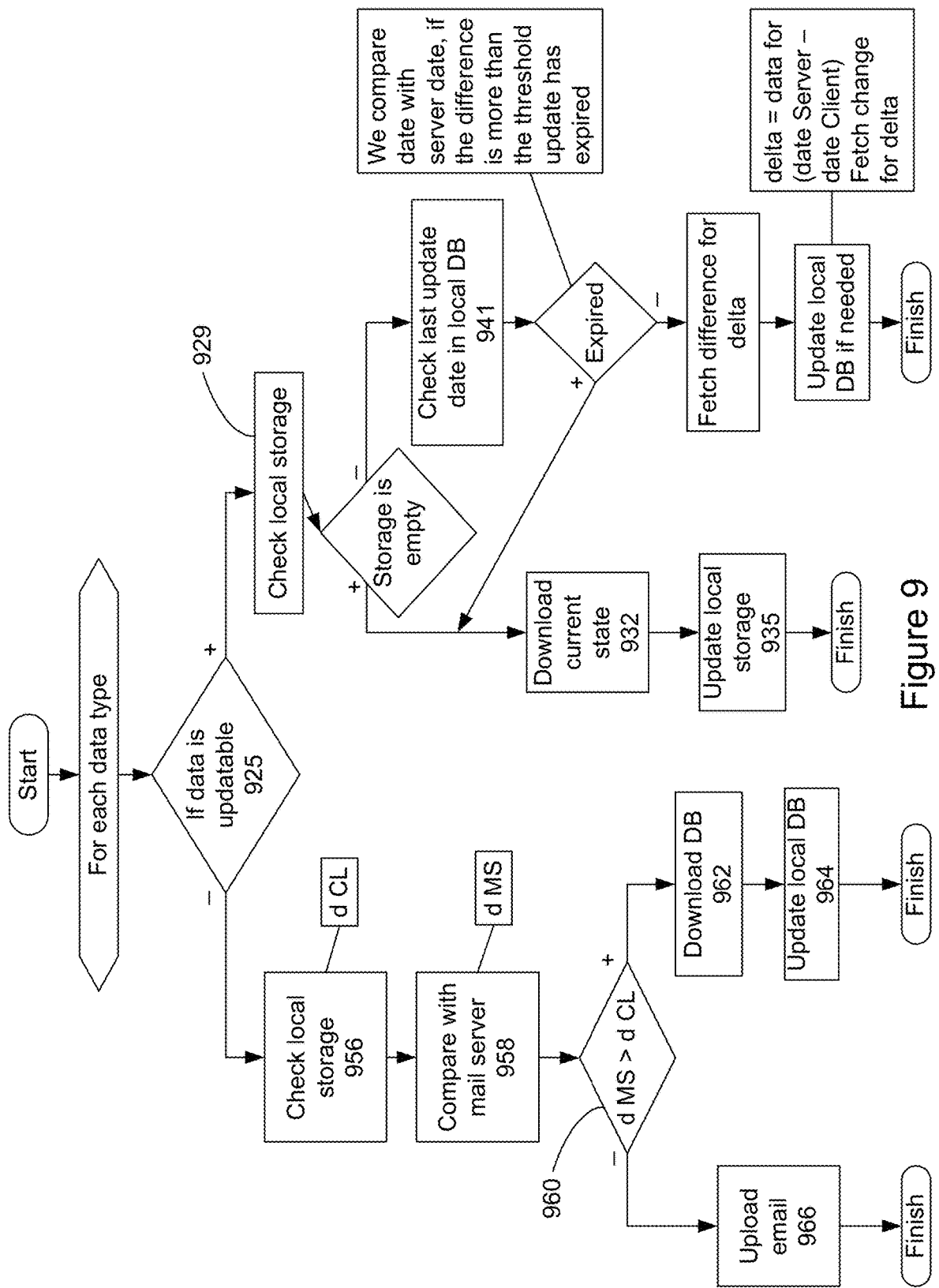
FIG. 9 shows the process of download data from mails server and syncing local storage.

FIG. 9 shows a process flow for downloading data from a mail server and synchronizing local storage.

1. Start. App is triggered to synchronize or sync the data.
2. Application has list of data types that should be synced. So the other flow steps are performed for each data type.
3. Check if data type is updatable (925).
3.1. If data type is updatable, check local storage for current data type state (929).
3.2. If the local storage is empty, meaning no data present, download current state (932) if there is data in mail server. Update the local store (935). Finish.
3.3. If the local storage is not empty, check the data of last update in local database (DB) (941). Check in mail server if there are newer updates for current data type; if there are newer updates the stored data is expired, while if there are not newer updates, the stored data is not expired. If the last update date in local database is smaller than last update date in mail server, we calculate the difference by diff=LOCAL_DATE−MAIL_SERVER_DATE. If the diff is larger than a predefined threshold, in that case we replace the local stored state with current state from server, otherwise fetch or pull only updates. Finish.
4.1. Otherwise, when data is replaceable (rather than updatable), check local storage for current data type (956).
4.2. Compare the date of update with server (958). A variable "d Cl" refers to date on client side, and "d MS" refers to date on mail server.
4.3. If (dMS>dCl) (960), replace the old one: download database (962) and update local database (964). Finish. When dCl>=dMS client, send or upload the new data to mail server (966). See further discussion below. Finish.

Figure 10:
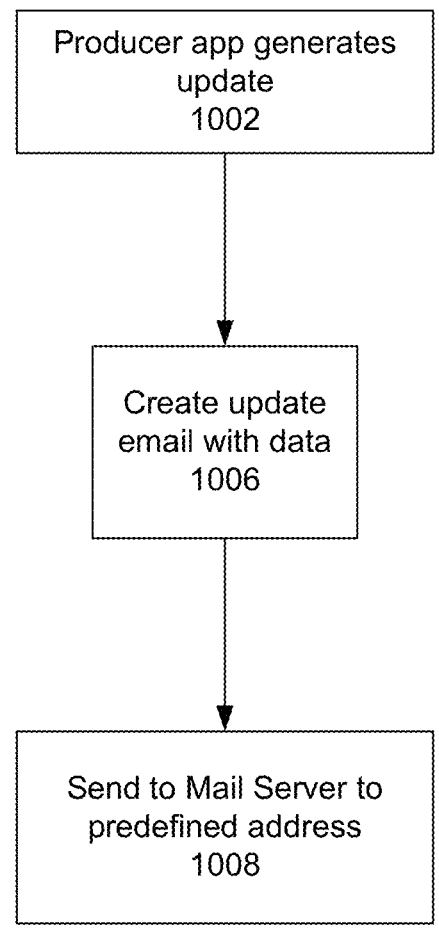
FIG. 10 shows an overview of process of sending data that should be synced with other nodes via mail server.

FIG. 10 shows an overview of process of sending data which should be synced with other nodes via mail server.

Step 10.1 (1002): In data producer application, new update is generated for one of the data types it supports.

Step 10.2 (1006): Based on data type an update message or email is created. The information is written in body, subject, or attachment portions of the email, or any combination of these portions.

Step 10.3 (1008): The message with data update is being sent to mail server via producer application to predefined email address. So other nodes that are monitoring the mail server will be able to download new data.

Figure 11:
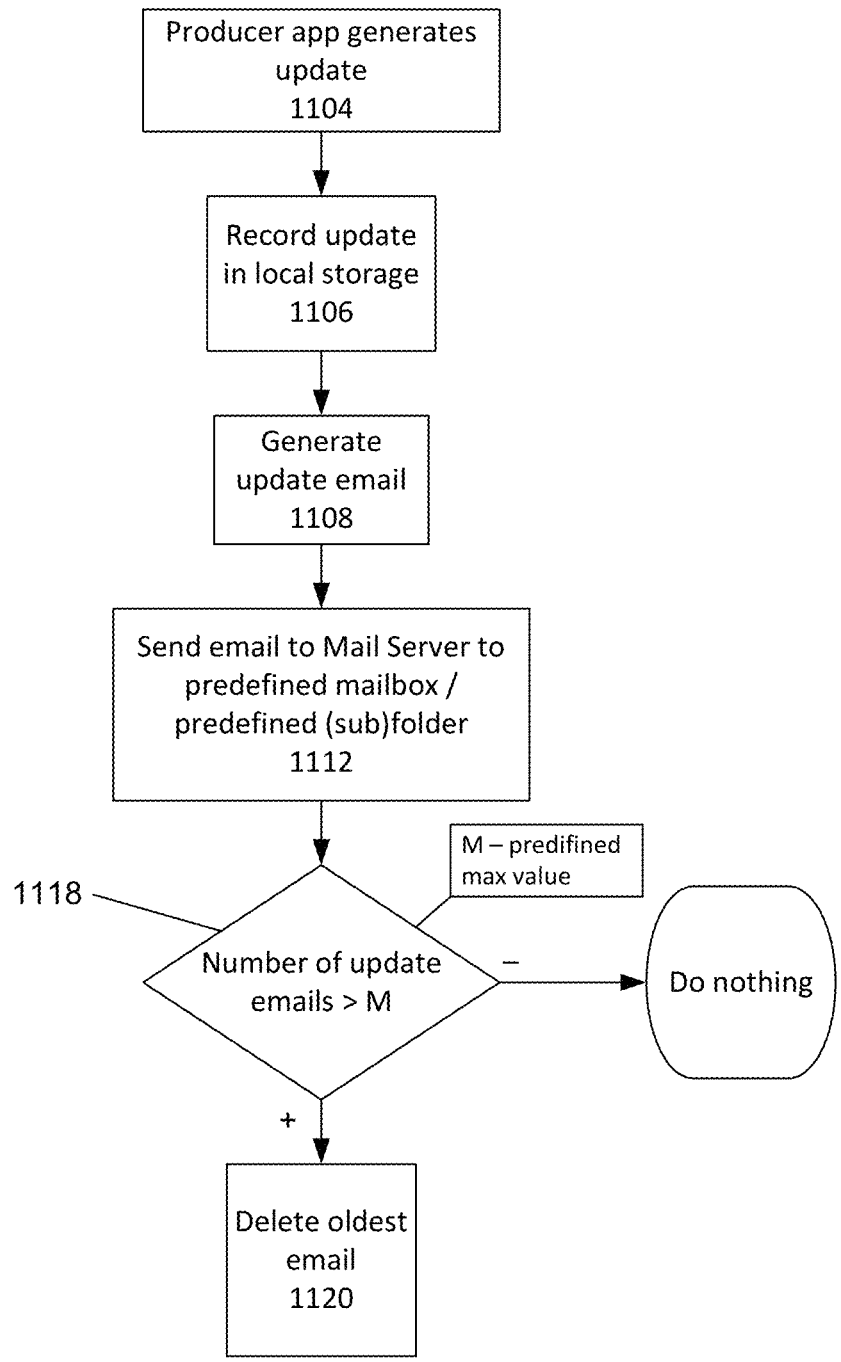
FIGS. 11-12 show an overview of process of sending data that should be synced with other nodes via mail server when data type is updatable data.
Figure 12:
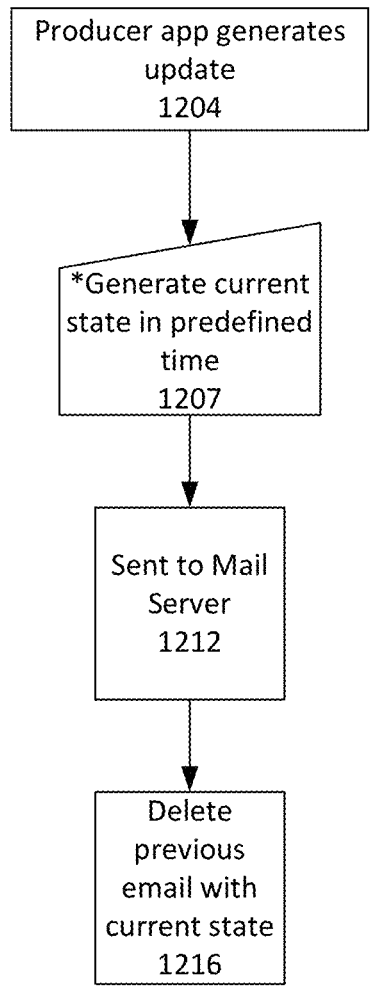

FIGS. 11-12 show an overview of process of sending data which should be synced with other nodes via mail server when data type is updatable data. The flows in FIGS. 11 and 12 are for update of delta (FIG. 11) and current state (FIG. 12).

Step 11.1 (1104 and 1204): In data producer application new update is being generated for one of the data types it supports. Usually it is triggered by user when he implements actions in application user interface.

Step 11.2: For change triggered by user:

Step 11.2a(1106): The update is recorded in local storage.

Step 11.2b(1108): An "update" email is generated. The email includes information about the update. The information can be written in subject, body, or attachment portions of the email, or any combination of portions of the email.

For updating current state, a step 1207 generates current state at a predefined time. The current state is generated at a predefined time or frequency (e.g., once a day; once every N hours, where N is an integer, once an hour, once every 2 hours, once every 3 hours, and so forth; once every P minutes or seconds, where P is an integer). The predefined time can be specified by a user.

Step 11.3 (1112 and 1212): Send the email to mail server to predefined email address. The address that is monitored by other nodes that will consume that data and synchronize the data with their local storage.

Step 11.4 (1118): For each data type, the number of email in mail server can be limited. Check if the number of "update" emails in mail server is more than predefined maximum (M) number of emails. If so, delete the oldest email (1120). This maintains a queue of update emails at the mail server, keeping the latest M emails, while emails greater than M are deleted from the queue.

Step 11.5 (1212): Once a predefined period of time "current" state of local storage is generated on client, the current state at this predefined time is sent to mail server.

Step 11.6 (1216): After that the client deletes any previous email with "current state."

Figure 13:
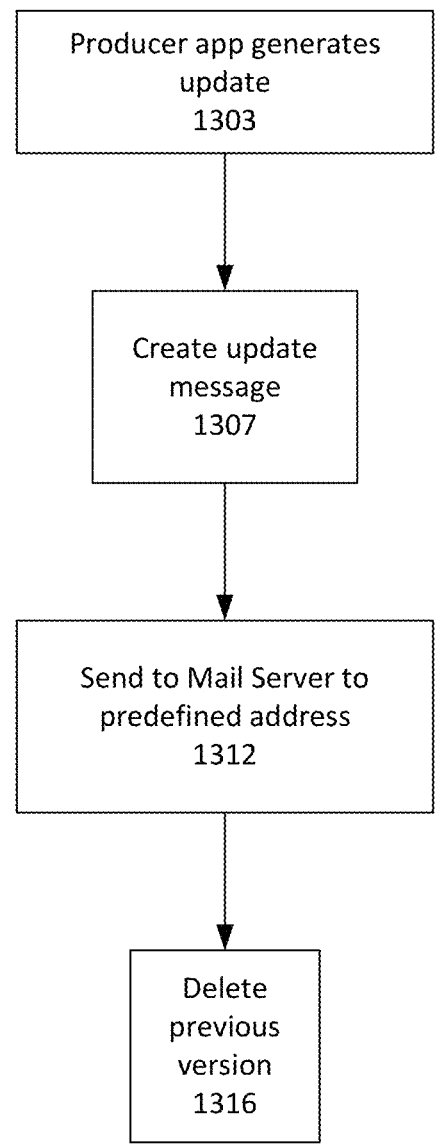
FIG. 13 shows an overview of process of sending data that should be synced with other nodes via mail server when data type is replaceable.

FIG. 13 shows an overview of process of sending data that should be synced with other nodes via mail server when data type is replaceable.

Step 13.1 (1303): In data producer application, new update is generated for one of the data types it supports. For example, the update can be to NODE train or retrain machine learning (ML) model.

Step 13.2 (1307): Create email for current data type which includes replaceable data in it. The data should be distributed to other nodes in system.

Step 13.3 (1312): Send email to mail server with predefined address.

Step 13.4 (1316): Delete previous version from mail server

Figure 14:
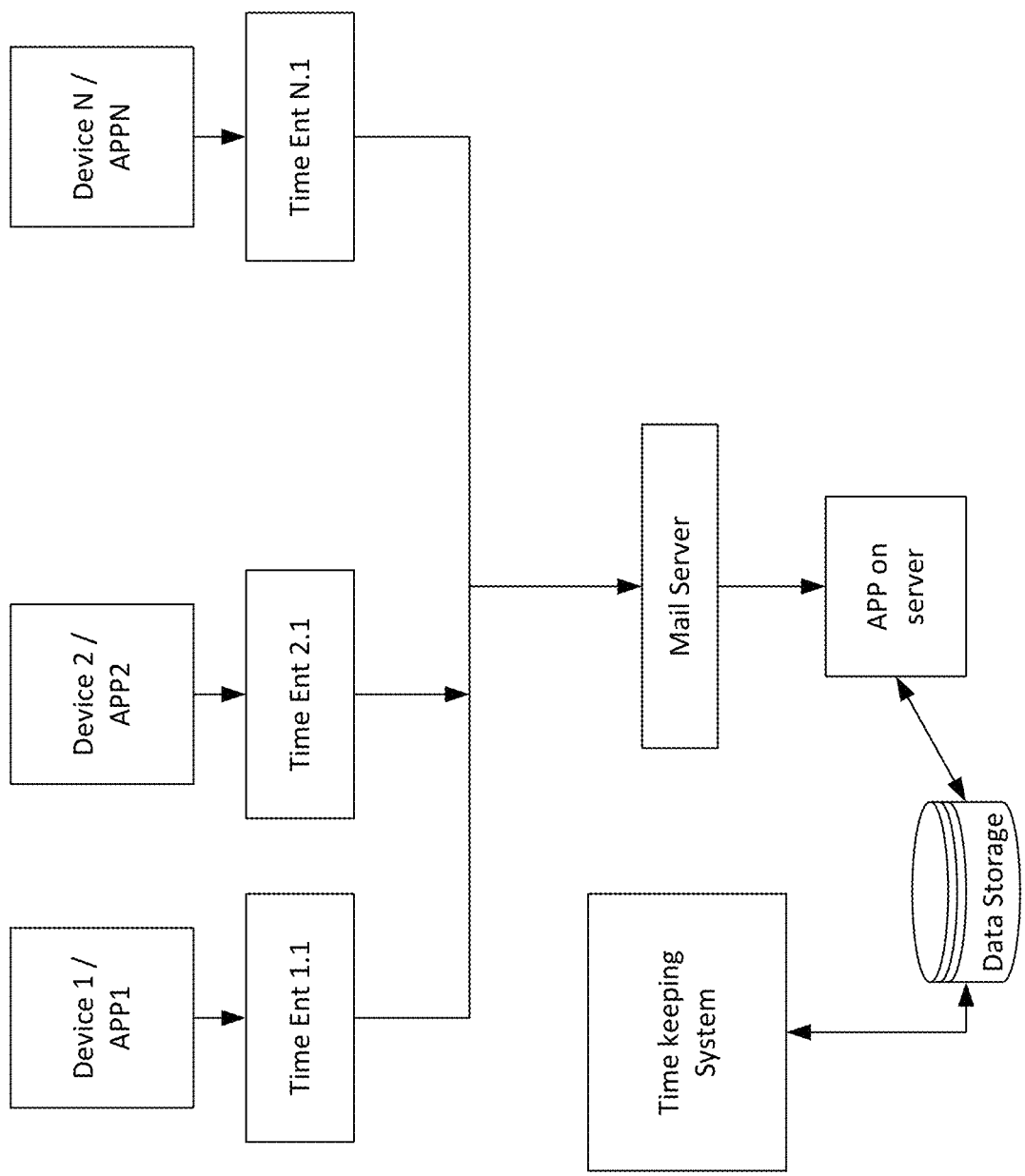
FIG. 14 shows an overview of process of sending data that should be synced with other nodes via mail server when data type is updatable. Example: syncing time keeping data across nodes.

FIG. 14 shows an overview of process of sending data that should be synced with other nodes via mail server when data type is updatable. This example is for syncing time keeping data across nodes. As an example, time keeping applications are used by professionals, such as doctors, lawyers, accountants, and others, to keep track of the time they work on matters for patients or clients. Then the time can be charged to the patients or client.

Application allows a user to create time entries, manually or automatically to track predefined actions. For example, the time entry is generated when the user reads email or attachments, or writes a response. Once the time entry has been generated there is a need to send it to time keeping or billing application also to make that entry be visible by other applications as well.

The direct connection of application with time keeping or billing systems may not be possible because of limitations of connections to service outside of the corporate network or absence of APIs. For example some time keeping and billing solutions allow updates only by direct record to their database or databases. And only services which are inside the corporate network may have access to update direct database.

Via mail server synchronization technology as described in this patent, once the time entry is being created on a device (in an application), the device sends an email to a predefined address with the time entry data. The monitoring apps download the update from the mail server. One of the apps can be a service inside a corporate network which have connection with time keeping system and adds the time entry into system.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
coupling a first device comprising a first application instance and a first data storage to a network of a system;
coupling a second device comprising a second application instance and a second data storage to the network;
providing a mail server, coupled to the first and second devices via the network;
receiving a first data change by a first user at the first device in the first application instance;
including information about the first data change to a first email and sending the first email with the first data change addressed to a predefined email address to the mail server;
at the second device, receiving the first email for the predefined email address with the first data change; and
making a determination whether to apply the first data change to the second application instance on the second device.

2. The method of claim 1 comprising:
if the determination is true, altering the second application instance using the first data change, wherein the making a determination whether to apply the first data change to the second application instance on the second device comprises
determining a data type of the first data change as being an updatable type, wherein when the data type is the updatable type, the altering the second application instance using the first data change comprises
updating the second application instance using the first data change.

3. The method of claim 1 comprising:
if the determination is true, altering the second application instance using the first data change, wherein the making a determination whether to apply the first data change to the second application instance on the second device comprises
determining a data type of the first data change as being a replaceable type, wherein when the data type is the replaceable type, the altering the second application instance using the first data change comprises
replacing data of the second application instance using the first data change.

4. The method of claim 1 comprising:
if the determination is true, altering the second application instance using the first data change, wherein the making a determination whether to apply the first data change to the second application instance on the second device comprises
determining a data type of the first data change as being an updatable type or replaceable type, wherein when the data type is the updatable type, the altering the second application instance using the first data change comprises
updating the second application instance using the first data change,
and when the data type is the replaceable type, the altering the second application instance using the first data change comprises
replacing data of the second application instance using the first data change.

5. The method of claim 1 comprising:
after the receiving the first email for the predefined email address with the first data change at the second device, checking if the second data storage is empty, and when empty, storing the first data change in the second data storage.

6. The method of claim 1 comprising:
after the receiving the first email for the predefined email address with the first data change at the second device, checking if the second data storage is empty, and when not empty, determining whether a date of the first data change is newer than a data change already stored in the second data storage, wherein
when the first data change is newer, replacing the data change already stored in the second data storage with the first data change, and
when the first data change is not newer, not replacing the data change already stored in the second data storage with the first data change.

7. The method of claim 1 comprising:
after the receiving the first email for the predefined email address with the first data change at the second device, checking if the second data storage is empty, and when not empty, determining whether a date of the first data change is newer than a data change already stored in the second data storage, wherein
when the first data change is newer by a predefined threshold, replacing the data change already stored in the second data storage with the first data change, and
when the first data change is not newer by the predefined threshold, not replacing the data change already stored in the second data storage with the first data change.

8. The method of claim 1 wherein the making a determination whether to apply the first data change to the second application instance on the second device comprises:
comparing a date of a second data change already stored in the second data storage to a date of the first data change received at the mail server, wherein
when the date of the first data change is newer than the second data change already stored in the second data storage, replacing the data change already stored in the second data storage with the first data change downloaded from the mail server.

9. The method of claim 8 wherein when the date of the second data change already stored in the second data storage is newer than the first data change, sending the second data change to the mail server via a second email from the second device to the predefined email address.

10. The method of claim 1 wherein an attachment to the first email comprises the first data change.

11. The method of claim 1 wherein a body portion of the first email comprises the first data change.

12. The method of claim 1 wherein a subject line portion of the first email comprises the first data change.

13. The method of claim 1 comprising:
automatically updating the first data storage at the first device with a current state of the first application instance according to a predefined schedule;
sending the current state stored in the first data storage by a second email for the predefined email address to the mail server;
receiving the second email at the second device with the current state; and
altering the second application instance based on the current state received via the second email.

14. The method of claim 1 comprising:
determining if a number of emails stored at the mail server for the predefined email address with change information is greater than a predefined maximum number of emails; and
if the number of emails exceeds the predefined maximum number of emails, deleting emails with change information stored at the mail server for the predefined email address, wherein the oldest emails are deleted first.

15. The method of claim 1 wherein the first and second application instances are time-tracking applications.

16. The method of claim 1 wherein the first device is a mobile device and the second device is a desktop computer.

17. The method of claim 1 wherein the first device uses a first operating system and the second device uses a second operating system, different from the first operating system.

18. The method of claim 1 wherein a first plugin to the first application instance handles the including information about the first data change to a first email and sending the first email with the first data change addressed to a predefined email address to the mail server.

19. The method of claim 18 wherein a second plugin to the second application instance handles the
at the second device, receiving the first email for the predefined email address with the first data change,
making a determination whether to apply the first data change to the second application instance on the second device, and
if the determination is true, altering the second application instance using the first data change.

20. A method comprising:
providing a first device comprising a first application instance and a first data storage;
providing a second device comprising a second application instance and a second data storage;
providing a mail server, coupled to the first and second devices via a network;
making a first data change by a first user at the first device in the first application instance;
including information about the first data change to a first email and sending the first email with the first data change addressed to a predefined email address to the mail server;
at the second device, receiving the first email for the predefined email address with the first data change;
making a determination whether to apply the first data change to the second application instance on the second device;
if the determination is true, altering the second application instance using the first data change;
if the determination is false, not altering the second application instance using the first data change;
comparing a date of a second data change already stored in the second data storage to a date of the first data change received at the mail server, wherein
when the date of the first data change is newer than the second data change already stored in the second data storage, replacing the data change already stored in the second data storage with the first data change downloaded from the mail server,
when the date of the second data change already stored in the second data storage is newer than the first data change, sending the second data change to the mail server via a second email from the second device to the predefined email address;
after the receiving the first email for the predefined email address with the first data change at the second device, checking if the second data storage is empty, and when not empty, determining whether a date of the first data change is newer than a data change already stored in the second data storage, wherein when the first data change is newer, replacing the data change already stored in the second data storage with the first data change, and when the first data change is not newer, not replacing the data change already stored in the second data storage with the first data change;

automatically updating the first data storage at the first device with a current state of the first application instance according to a predefined schedule;

sending the current state stored in the first data storage by a second email for the predefined email address to the mail server;

receiving the second email at the second device with the current state; and altering the second application instance based on the current state received via the second email;

maintaining a queue of emails at the mail server for the predefined email address with change information is greater than a predefined maximum number of emails; and if a number of emails in the queue exceeds the predefined maximum number of emails, deleting emails with change information stored at the mail server for the predefined email address, wherein the oldest emails are deleted first.

\* \* \* \* \*